Figure 1:
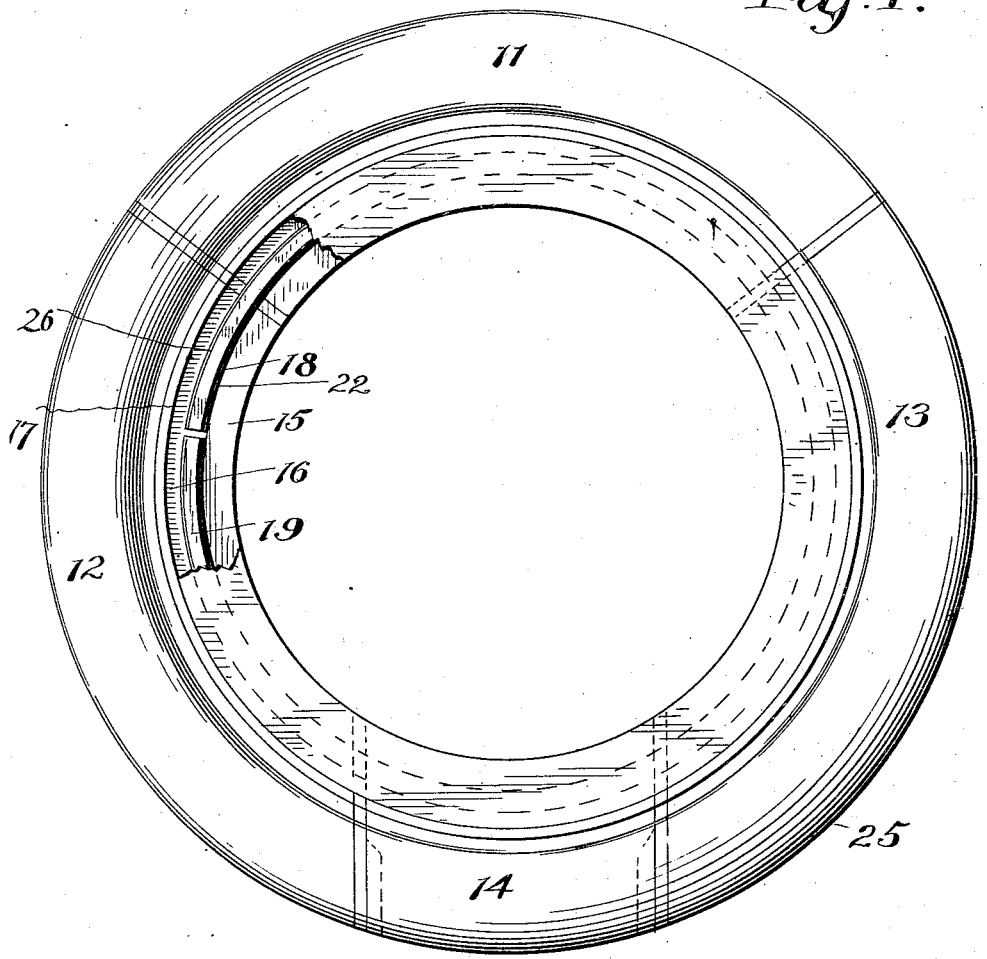

P. E. WELTON.
CORE FOR MANUFACTURE OF PNEUMATIC TIRE CASINGS.
APPLICATION FILED DEC 18, 1913.

1,156,570.

Patented Oct. 12, 1915.

Witnesses
E. B. Gilchrist
L. J. Porter

Inventor
Park E. Welton
by Thurston & Kwis
Attorneys

UNITED STATES PATENT OFFICE.

PARK E. WELTON, OF AKRON, OHIO, ASSIGNOR TO KATHERINE B. WELTON, OF AKRON, OHIO.

CORE FOR MANUFACTURE OF PNEUMATIC-TIRE CASINGS.

1,156,570.  Specification of Letters Patent.  Patented Oct. 12, 1915.

Application filed December 18, 1913. Serial No. 807,397.

*To all whom it may concern:*

Be it known that I, PARK E. WELTON, a citizen of the United States, residing at Akron, in the county of Summit and State of Ohio, have invented a certain new and useful Improvement in Cores for Manufacture of Pneumatic-Tire Casings, of which the following is a full, clear, and exact description.

This invention relates to novel means by which the sections of a knock-down tire core may be quickly and accurately brought into and held in proper relation to one another, and quickly disconnected when the core is to be knocked down in order that it may be removed from the finished tire casing.

The invention in the form disclosed in the drawing, not only serves the above purposes, but likewise it permits the core to be put together and taken apart from the same side thereof—that is to say, without having to lift it or turn it over.

Another advantage of the construction is that the inevitable wear of connecting and disconnecting the core sections does not render them useless, because they can be machined back into shape, and the whole device rendered operative by the substitution of a new inexpensive part, for example, the split spring ring or the binding ring, both of which will be hereinafter described.

The invention consists in the construction and combination of parts hereinafter described and pointed out definitely in the appended claims.

Figure 2:
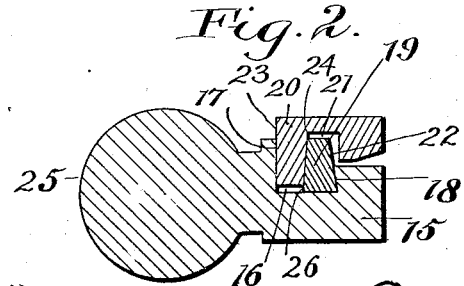

In the drawing, Figure 1 is a plan view of an assembled knock-down core in which this invention is embodied, the binding and centering ring being broken away at one place; and Fig. 2 is a transverse sectional view through one side of one of the core sections and the connecting devices.

Referring to the parts by numerals 11, 12, 13 and 14 represent the arc shaped core sections of which the latter is the key section and has parallel ends. The cross sectional configuration of said sections is such as shown in Fig. 2, that when they are accurately assembled the outer part 25 serves as a form which fits into a tire casing, while its inner part forms the flange 15. This flange is, of course, formed partly on each of the core sections. In the upper face of this flange is an annular groove 16, having, when the core sections are in the proper relative positions, an outer wall 17, which is a true cylinder. The inner wall 18 of this annular groove is preferably slightly undercut, as shown.

19 represents a split spring ring whose inner peripheral edge 22 is inclined at an angle corresponding with that of the undercut wall 18. The outer peripheral edge 26 of this split ring is also slightly tapered, as shown.

20 represents the binding and centering ring. Its outer periphery 23 is a cylinder of the same diameter as the inner periphery 17 of the core. In the bottom face of this ring is an annular groove 21 whose inner peripheral wall 24 is tapered to correspond with the taper of the outer peripheral edge 26 of the split ring.

In assembling the core, the sections are laid upon a flat surface with the grooved side of the flange uppermost; and they are moved to approximately the required relative positions. Then the split ring 19 is put into the groove 16. The core sections are then moved outward until the inner wall 18 of the groove 16 on all of the sections engages with the inner periphery of the split ring. Then the binding ring 20 is put in place,—that is it is put within the annular wall 17, and then is driven down. Its inclined face 24 by engaging with the inclined outer surface of the split ring will contract said ring; and the ring in so contracting will draw the core sections inward toward the center of the core, whereby the cylindrical outer wall of the groove 16 in said core sections will be brought squarely and firmly against the cylindrical outer periphery of said binding ring; and this obviously positions the core sections with absolute accuracy. The friction between this binding ring and the split ring, and the outer wall of groove 16 will be sufficient to hold said binding ring in place so as to prevent any movement of the core sections while the core is in use. The undercutting of the inner wall of groove 16 and the corresponding taper of the outer periphery of the split ring makes the displacement of the split ring impossible. When it is desired to knock down the core, one inserts a screw driver or the like into the space between the lower face of the inner edge of the binding ring 20 and the top surface of the flange 15, and pries the binding ring up. When the binding ring is removed, the split ring can be removed, and the core sections may then be separated in the usual way.

It is to be noted that the split ring and the binding ring are put in place from what we may call the top of the core, and that these parts may be easily removed from the top of the core without the necessity of turning it over. Moreover all of the wear incident to assembling and disassembling of the described parts will come between the engaging surfaces of the binding ring 20 and the split ring 19. Until this wear has been considerable, the construction will remain operative because the binding ring may be driven farther down into the groove 16. When this wear has become too great to permit this, it is only necessary to substitute another split ring 19 or another binding ring.

Having described my invention, I claim:

1. An annular knock-down core comprising several arc-shaped sections, and having, when the sections are accurately assembled, an inwardly extended horizontal flange in the upper surface of which is an annular groove having a cylindrical outer periphery, combined with a split spring ring which lies in said groove and has a tapered outer periphery, and a binding ring having a cylindrical outer periphery for engagement with the cylindrical outer periphery of the above mentioned annular groove and having in its lower face an annular groove whose periphery is tapered to correspond with the taper of the split ring which projects into said groove.

2. An annular knock-down core comprising several arc-shaped sections and having, when the sections are accurately assembled, an inwardly extended horizontal flange in the upper surface of which is an annular groove whose outer periphery is cylindrical, and whose inner periphery is undercut, combined with a split spring ring which lies in said groove and has a tapered outer periphery and a tapered inner periphery for engaging the undercut periphery of the annular groove in the core flange above mentioned, and a binding ring having a cylindrical outer periphery for engagement with the cylindrical outer periphery of the groove in the core flange, and having in its lower face an annular groove whose outer periphery is tapered to correspond with the taper of the split ring which projects into it when the binding ring is inserted into the annular groove in the core flange.

3. The combination, with a plurality of core segments each having an arcuate recess therein having spaced concentric walls one of the walls being tapered and said recesses forming, when the segments are assembled, a complete annular recess, one of the concentric walls whereof is tapered, of a ring coöperating with such annular recess and comprising an outer ring and an inner ring one of said rings being split and having a surface tapered complementarily to the tapered wall of said recess.

4. The combination, with a plurality of core segments each having an arcuate recess therein having spaced concentric walls the inner wall being tapered, said recesses forming, when the segments are assembled, a complete annular recess, the inner wall whereof is tapered and a ring coöperating with such annular recess and comprising an outer continuous ring and an inner split ring, the inner split ring having its inner surface tapered complementarily to the tapered wall of said recess.

5. In a device of the character described, a ring core formed of abutting sections having inwardly extending portions, said portions being channeled on one of their faces to form a complete annular groove, the inner wall whereof is undercut, an inner cut ring member having its inner surface shaped complementarily to the undercut wall of said groove, and an outer wedge-ring member disposed in said groove coacting with said first member for drawing the sections firmly together at their abutting faces.

In testimony whereof, I hereunto affix my signature in the presence of two witnesses.

PARK E. WELTON.

Witnesses:
L. I. PORTER,
A. J. HUDSON.

Copies of this patent may be obtained for five cents each, by addressing the "Commissioner of Patents, Washington, D. C."